June 24, 1930.  T. HALL  1,767,756
RECTANGULAR SHUTTER FOR SPOTLIGHTS
Filed March 26, 1929  2 Sheets-Sheet 1
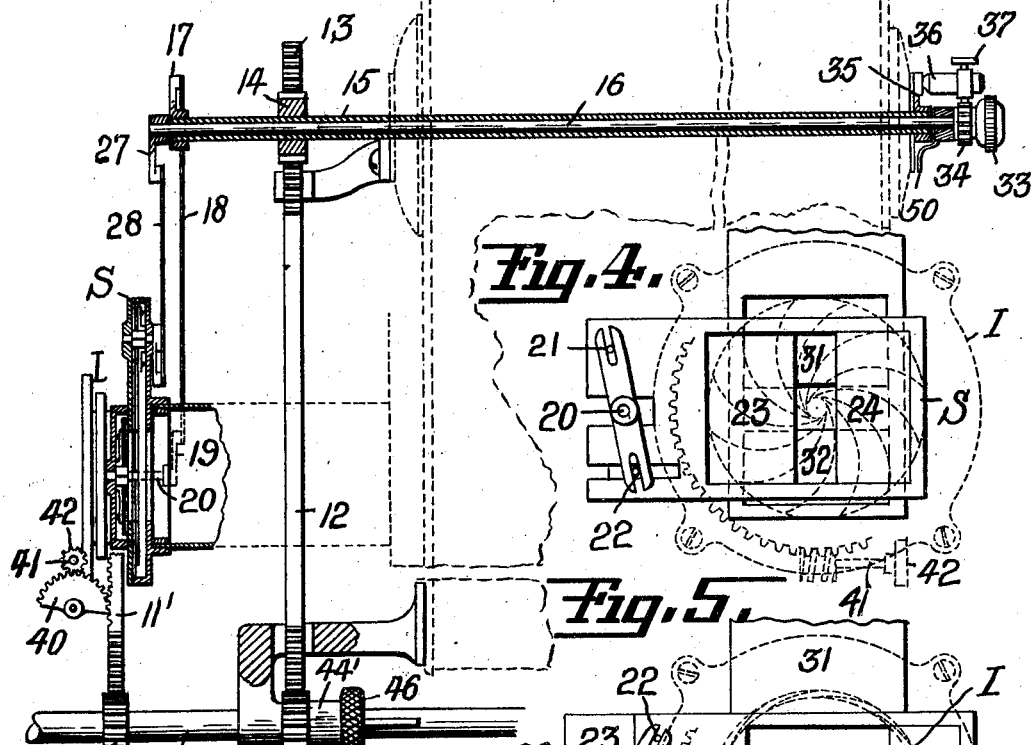
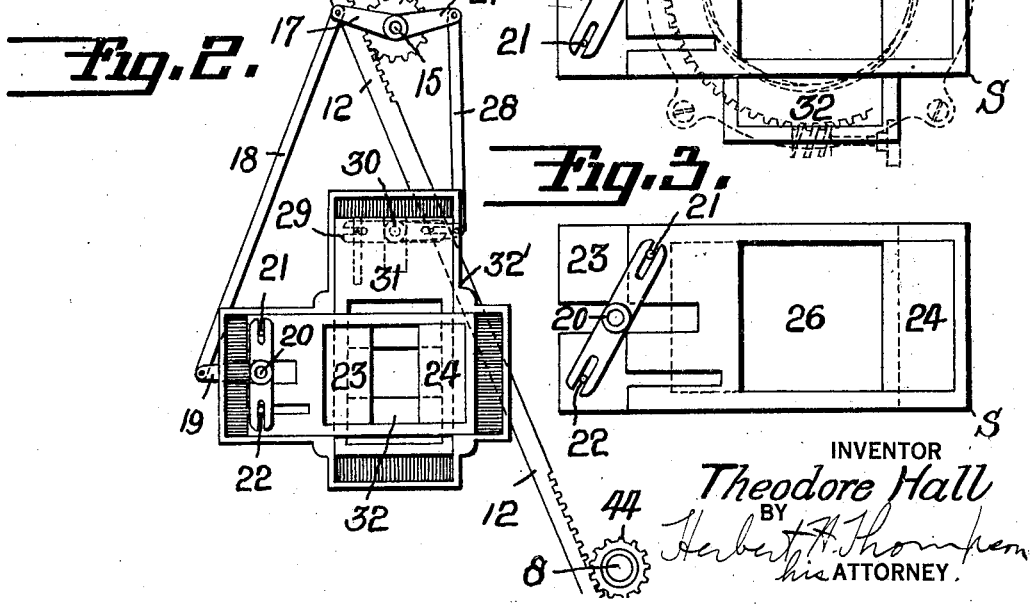
INVENTOR
Theodore Hall
BY
Herbert H. Thompson
his ATTORNEY.

June 24, 1930.  T. HALL  1,767,756
RECTANGULAR SHUTTER FOR SPOTLIGHTS
Filed March 26, 1929.  2 Sheets-Sheet 2
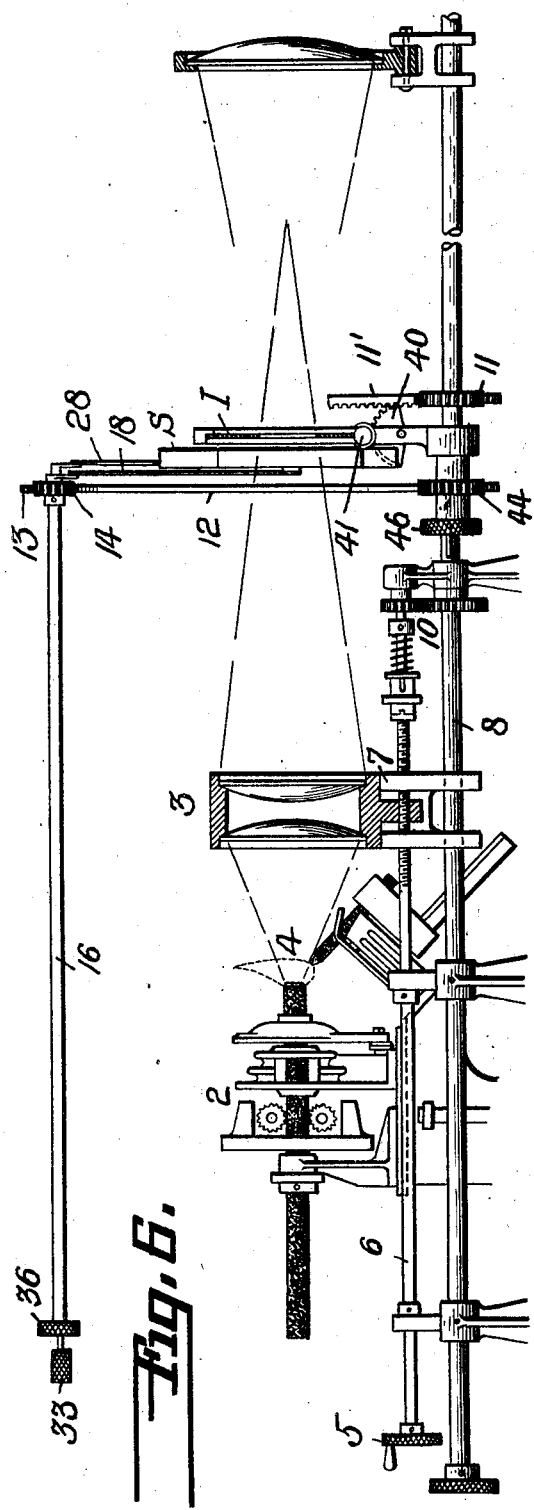
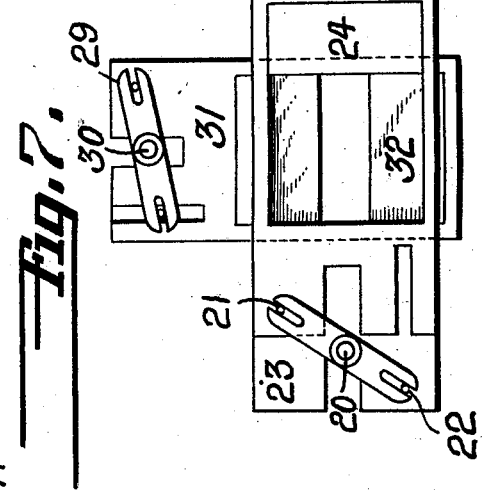
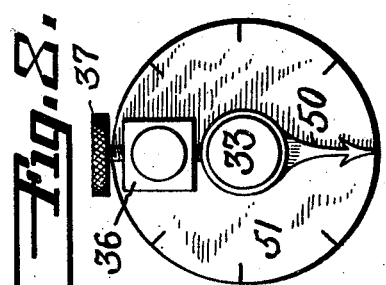
INVENTOR
Theodore Hall
BY
Herbert H. Thompson
his ATTORNEY Patented June 24, 1930

1,767,756

UNITED STATES PATENT OFFICE

THEODORE HALL, OF NEW YORK, N. Y., ASSIGNOR TO HALL & CONNOLLY, INC., OF NEW YORK, N. Y., A CORPORATION OF NEW YORK

RECTANGULAR SHUTTER FOR SPOTLIGHTS

Application filed March 26, 1929. Serial No. 349,931.

This invention relates to projector lamps especially designed for illuminating either all or a small portion of the stage in theaters or public halls. More particularly the invention pertains to a means for varying the shape and size of the projected beam so that the maximum amount of light may be thrown upon the stage in the desired size, shape and location, and the illumination of other objects, such as the wings or the top of the curtains, avoided. In my prior Patent No. 1,691,475 for Projector lamps, dated November 13, 1928, I have disclosed the employment of an iris shutter which is adjusted automatically with the spread of the beam so as to make use of the maximum amount of light at all times. In the present invention I propose to employ a novel type of shutter in the same combination either in place of or in addition to the iris shutter.

Referring to the drawings in which the preferred form of the invention is shown, Fig. 1 is a vertical sectional view through the forward portion of the projector machine showing the shutter mechanisms and the operating means therefor.

Fig. 2 is a front elevation of my rectangular shutter.

Fig. 3 is a detail showing the horizontally movable elements only.

Fig. 4 is a front elevation of my shutter showing how the same is employed with an iris shutter to produce a small spotlight.

Fig. 5 is a similar view showing both shutters wide open.

Fig. 6 is a diagrammatic side elevation of a projector lamp showing the interconnecting parts between the shutters and the other parts of the optical system.

Fig. 7 is a view showing the shutters arranged to throw a rectangular spot of light on the stage rather than a square spot.

Fig. 8 is a detail showing the adjusting handles for the rectangular shutter.

Referring first to Figs. 1 and 6, the projector lamp housing is represented at 1 in dotted lines in Fig. 1, the lamp mechanism not being shown therein but being illustrated generally at 2 in Fig. 6. As in my prior patent I prefer to adjust the position of the condenser lenses 3 with respect to the source of light 4 for varying the spread of the beam and I provide means interconnecting the said adjusting means with the shutters. As shown, this adjustment is effected by handle 5 on shaft 6 which is threaded in a carriage 7 supporting the condenser lens. Said shaft may drive a second shaft 8 through gears 10. Shaft 8 may serve to adjust both the iris shutter I and the slidable shutter S. For the former purpose, a pinion 11 meshes with a rack bar 11', which in turn meshes with a gear sector 40, which in turn drives a worm shaft 41 through pinion 42. For operating the other shutter, shaft 8 is also shown as provided with a pinion 44 which meshes with a rack bar 12. Said pinion is shown as secured to a sleeve 44' splined on shaft 8 and provided at its outer end with knurled knob 46, for pulling pinion 44 out of mesh with rack 12 for a purpose hereinafter described. Said bar is also provided with teeth 13 adjacent its upper end meshing with a pinion 14 on a second shaft 15. Said shaft is shown as hollow and through the same extends an inner shaft 16. Normally said shafts are rotated together, as hereinafter explained, so that when the handle 8 is turned both the shafts 15 and 16 are turned together, and this movement is made use of to operate my novel shutter. For this purpose I have shown secured to sleeve 15 an arm 17 which is connected through a link 18 to a second arm 19 which may be in the form of a double bell crank or T-shaped lever pivoted at 20. Adjacent each side of said pivot said lever is slidably connected to pins 21—22 secured to slides 23—24 so that as said lever 19 is turned said slides are moved in opposite directions. Each slide is provided with a substantially square aperture 26 so that when the apertures register as shown in Fig. 3 a large square opening is presented, but as the shutters are closed the aperture in this instance is narrowed so as to produce a vertical rectangular slot. Similarly, to the shaft 16 is secured a lever 27 linked by a link 28 to a similar T-shaped lever 29 pivoted at 30. Said lever, like lever 19, is pinned at opposite ends to two slides 31—32 adjustable vertically in the common frame 32' in which the slides are mounted. It will, therefore, be seen that if the two shafts 20 and 30 are rotated equally, that a square opening of variable size will be produced, which is always maintained with its center at the same point, namely, in the center of the beam.

I provide, however, means for separately adjusting the shaft 15 and 16 so as to vary the shape of the opening as above stated. For this purpose I provide the shaft 16 with a knurled head 33 and also with a toothed pinion 34. Secured to sleeve 15 is an arm 35 having a knob 36 projecting therefrom in which is threaded a set screw 37. When the set screw does not engage the teeth of pinion 34 the shaft 16 may be turned through knob 33 and the sleeve 15 may be independently turned by grasping the handle 36. Therefore, with this adjustment, any variation in shape of a rectangular spot desired may be secured. When, however, a square spot of variable size is desired or it is desired to adjust the two sets of slides together to produce a variable size rectangular spot without change of shape, the setscrew 37 is screwed down into engagement with the teeth and pinion 34 so that both shafts are turned together. An indicating hand 50 is shown on shaft 16, readable on dial 51 on shaft 16 to show the relative setting of the two shafts and hence the shape of the opening in the shutter (Fig. 8).

My shutter may be employed either alone or in conjunction with the present type of iris shutter. When so employed, I prefer to adjust the gear ratio such that the iris shutter has the faster rate of opening. This results in producing on the stage a round spot of light when the projector is adjusted to give a very small beam, for instance, when throwing a spotlight on just one or two persons on the stage (see Fig. 4). As, however, the shutters are opened the iris opens the faster so that when the full beam is thrown on the stage it is square or rectangular in section (Fig. 5). By this means a large flood-light is obtained and at the same time the light prevented from striking the top and bottom of the stage, thus producing objectionable fringes of light. If, however, it is desired to use the square spot throughout the range of the lamp, this can be done by changing the relative setting of the two telescopic shutters by disengaging pinion 44 and rack bar 12 by pulling out knob 46 adjusting the iris and then engaging the pinion again so that the opening in the square shutter will fall within or be circumscribed by the smallest opening of the iris shutter.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described by invention, what I claim and desire to secure by Letters Patent is:

1. In a projector lamp, a source of light, condenser, and objective lens, a shutter for varying the size of the projected beam comprising a plurality of pairs of rectangularly movable telescopic slides having overlapping apertures therein, means for moving oppositely the members of each pair, and means for moving all pairs simultaneously.

2. In a projector lamp, a source of light, condenser, and objective lens, a shutter for varying the size of the projected beam comprising a plurality of pairs of rectangularly movable telescopic slides having overlapping apertures therein, means for moving oppositely the members of each pair, and means for moving said pairs at will.

3. In a projector lamp, a source of light, an optical system therefor including a condenser, and objective lens, means for varying the beam spread by adjusting the optical system, a shutter comprising a plurality of pairs of telescopic slides having overlapping apertures therein, and means for moving oppositely the members of each pair by the first-named means.

4. In a projector lamp, a plurality of shutters in the path of the beam including an iris shutter and a shutter having rectangularly movable slides, and a common means for adjusting both shutters at a relative rate so as to form a small round spot and a large rectangular beam.

5. In a projector lamp, a plurality of shutters in the path of the beam including an iris shutter and a shutter having rectangularly movable slides, a common means for adjusting both shutters, and means for varying their relative setting to vary the shape of the projected beam for different size openings.

6. In a projector lamp, a source of light, an optical system therefor including a condenser, and objective lens, means for varying the beam spread by adjusting the optical system, a shutter comprising a plurality of pairs of telescopic slides having overlapping apertures therein, an iris shutter, and a common means for adjusting both said slides and iris shutter by said first-named means.

In testimony whereof I have affixed my signature.

THEODORE HALL.